US010521261B2

(12) United States Patent
Suda et al.

(10) Patent No.: US 10,521,261 B2
(45) Date of Patent: Dec. 31, 2019

(54) MANAGEMENT SYSTEM AND MANAGEMENT METHOD WHICH MANAGE COMPUTER SYSTEM

(71) Applicant: HITACHI, LTD., Tokyo (JP)

(72) Inventors: Tadayuki Suda, Tokyo (JP); Kousuke Shibata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 15/740,658

(22) PCT Filed: Mar. 7, 2016

(86) PCT No.: PCT/JP2016/056930
§ 371 (c)(1),
(2) Date: Dec. 28, 2017

(87) PCT Pub. No.: WO2017/154063
PCT Pub. Date: Sep. 14, 2017

(65) Prior Publication Data
US 2018/0196689 A1 Jul. 12, 2018

(51) Int. Cl.
*G06F 9/46* (2006.01)
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/067* (2013.01); *G06F 3/0664* (2013.01); *G06F 2009/4557* (2013.01)

(58) Field of Classification Search
CPC ... H04L 41/0859; H04L 41/085; H04L 41/08; H04L 41/0853; H04L 41/0813;
(Continued)

(56) References Cited

U.S. PATENT DOCUMENTS 7,539,634 B2 * 5/2009 Goodbody ........... G06Q 10/087 705/28
2007/0214192 A1 9/2007 Murakami et al.
(Continued)

FOREIGN PATENT DOCUMENTS

JP 2007-241873 A 9/2007
JP 2010-146306 A 7/2010
WO 2013/001609 A1 1/2013

OTHER PUBLICATIONS

International Search Report for WO 2017/154063 A1, dated May 10, 2016.

*Primary Examiner* — Emerson C Puente
*Assistant Examiner* — Zhi Chen
(74) *Attorney, Agent, or Firm* — Volpe and Koenig, P.C.

(57) ABSTRACT

A management system retains a plurality of configuration information entries and a plurality of change information entries. Each of the plurality of configuration information entries is information which represents a change of a configuration of a computer system and includes at least a portion of: information which is included in information which is periodically collected from the computer system; and information which is identified on the basis of first and second information which is respectively polled from the computer system in first and second collection. Each of the plurality of change information entries is information which represents a change of a configuration of the computer system and includes manually inputted information relating to the change of configuration of the computer system. The management system associates at least one of the plurality of change information entries with at least one of the plurality of configuration information entries and manages same.

9 Claims, 15 Drawing Sheets

(58) Field of Classification Search
CPC ............. H04L 41/0803; G06F 11/3003; G06F 11/3051; G06F 11/3055; G06F 11/3065; G06F 11/34; G06F 9/5005; G06F 9/5061; G06F 3/067; G06F 3/0604; G06F 3/0664; G06F 3/0662; G06F 3/0665; G06F 3/0653; G06F 3/0638; G06F 3/0632; G06F 3/0634; G06F 3/0635
See application file for complete search history.

(56) References Cited

U.S. PATENT DOCUMENTS

| | | | | |
|---|---|---|---|---|
| 2009/0210233 | A1* | 8/2009 | Thompson, III | G10L 15/26 704/275 |
| 2011/0137774 | A1* | 6/2011 | Jakilinki | G06Q 30/04 705/34 |
| 2013/0007262 | A1 | 1/2013 | Akatoki et al. | |
| 2018/0189258 | A1* | 7/2018 | Bhaya | G06F 17/2705 |

* cited by examiner

FIG. 3

Node table
211

301 302 303

| Node ID | Node type | Polling time |
|---|---|---|
| Server1 | SERVER | 2015/9/5 2:00 |
| Server2 | SERVER | 2015/9/5 2:00 |
| Storage1 | STORAGE | 2015/9/5 2:00 |
| FC-Switch1 | FCSWITCH | 2015/9/5 2:00 |
| ... | ... | ... |

FIG. 4

Node detail table
212

401 402 403 404 405 406 407 408

| Node ID | Node name | OS name | Memory capacity | CPU | Disk capacity | IP address | Polling time |
|---|---|---|---|---|---|---|---|
| Server1 | Server1 | Windows 2012R2 | 8G | 3.5 GHz | 15TB | 100.101.102.101 | 2015/9/5 2:00 |
| Server2 | Server2 | Windows 2012 | 16G | 3.0 GHz | 10TB | 100.101.102.102 | 2015/9/5 2:00 |
| ... | ... | ... | ... | ... | ... | ... | ... |

FIG. 5

Component table
213

501 502 503 504

| Component ID | Component type | Component name | Parent node ID |
|---|---|---|---|
| Server1/LAN_Adapter1 | LAN_ADAPTER | LAN_Adapter1 | Server1 |
| Server1/iSCSI_Disk1 | ISCSI_DISK | iSCSI_Disk1 | Server1 |
| Server1/CPU1 | CPU | CPU1 | Server1 |
| Server1/Memory1 | MEMORY | Memory1 | Server1 |
| Server2/Memory2 | MEMORY | Memory2 | Server2 |
| Server2/Application1 | APPLICATION | Application1 | Server2 |
| Server2/FileSystem1 | FILE_SYSTEM | FileSystem1 | Server2 |
| Storage1/DiskDrive1 | STORAGE_DISK | DiskDrive1 | Storage1 |
| Storage1/DiskDrive2 | STORAGE_DISK | DiskDrive2 | Storage1 |
| Storage1/DiskDrive3 | STORAGE_DISK | DiskDrive3 | Storage1 |
| Storage1/Volume1 | STORAGE_VOLUME | Volume1 | Storage1 |
| Storage1/Volume2 | STORAGE_VOLUME | Volume2 | Storage1 |
| Storage1/LU1 | STORAGE_LU | LU1 | Storage1 |
| Storage1/LU2 | STORAGE_LU | LU2 | Storage1 |
| Storage1/LU3 | STORAGE_LU | LU3 | Storage1 |
| FC-Switch1/Port1 | FC_PORT | Port1 | FC-Switch1 |
| ... | ... | ... | ... |

FIG. 6

Change event table
214

601 602 603 604 605 606 607

| Event ID | Node ID | Component ID | Event type | Change content | Previous polling time | Current polling time |
|---|---|---|---|---|---|---|
| E1 | Server1 | Server1/iSCSI _Disk1 | Change | Change to 15TB | 2015/9/1 2:00 | 2015/9/2 2:00 |
| E2 | Server2 | Server2/ Memory2 | Addition | Add 8GB | 2015/9/4 2:00 | 2015/9/5 2:00 |
| E3 | Server3 | Server3/ Memory2 | Deletion | Delete 8GB | 2015/9/4 2:00 | 2015/9/5 2:00 |
| ... | ... | ... | ... | ... | ... | ... |

FIG. 7

Matching rule table
220

701 702 703 704

| Rule ID | Target component type | Virtual change record creation method | Change type |
|---|---|---|---|
| R1 | ISCSI_DISK | Join | Add, delete |
| R2 | MEMORY | Division | Add, delete |
| R3 | MEMORY | Join | Add, delete |
| R4 | MEMORY | Division and join | Add, delete |
| ... | ... | ... | ... |

FIG. 8

Change table
230

| Change ID (801) | Component ID (802) | Change type (803) | Change content (804) | Change detail (805): Change time (811) | Title (812) | Person who makes change (813) | Event ID (814) | … |
|---|---|---|---|---|---|---|---|---|
| CI1 | Server1/ iSCSI_Disk1 | Change | Change to 15TB | 2015/9/1 10:00 | Replace HDD | User1 | E1 | … |
| CI2 | Server2/ Memory2 | Addition | Add 8G | 2015/9/4 15:00 | Increase memory | User2 | N/A | … |
| CI3 | Server2/ Memory3, Server3/ Memory2 | Addition and deletion | Add 8G Delete 8G | 2015/9/4 15:00 | Change target of memory increase | User2 | N/A | … |
| | … | … | … | … | … | … | … | … |

FIG. 9

Matching table
240

| Event ID (901) | Change ID (902) |
|---|---|
| E1 | CI1 |
| E2 | CI2, CI3 |
| E3 | CI3 |
| … | … |

MANAGEMENT SYSTEM AND MANAGEMENT METHOD WHICH MANAGE COMPUTER SYSTEM

TECHNICAL FIELD

This invention relates generally to the management of a computer system.

BACKGROUND ART

For example, PTL 1 is known as a technology for managing a computer system. In PTL 1, the following processing is performed. That is, in response to detection of changes of resources in a computer to be managed, an agent resident on the computer to be managed notifies a manager on an operation management server of contents of the change of resources. In a change plan DB (database) on the operation management server, contents of resource changes to be planed for individual resource changes for computers to be managed are registered. The manager checks whether the contents of the resource change notified from the agent follow a plan of the resource change registered in the change plan DB. If the contents of the resource change follow the plan, the manager registers the fact that the resource change registered in the change plan DB has completed as planned.

CITATION LIST

Patent Literature

[PTL 1]
Japanese Patent Application Publication No. 2007-241873

SUMMARY OF INVENTION

Technical Problem

As a management system for a computer system, a management system collects information from a computer system at polling intervals (regularly) is known. In general, information to be collected is configuration information of a computer system. The configuration information is information related to configurations of a computer system.

The polling interval is determined on the basis of the scale of the computer system (specifically, the amount of information depending on the scale of the computer system (amount of information to be collected)). Depending on the scale of the computer system, the polling interval is set to a long interval (for example, "1 day"). This is because it takes long time to collect information once.

In a case that the polling interval is long, the configuration of a computer system may be changed a plurality of times during a certain polling period (from a start time of a certain polling to a start time of the next polling (not including the next polling time)). The configuration change can be detected from a comparison between information collected in the current polling period and information collected in the previous polling period, but the details of the detected configuration change (for example, whether the detected configuration change is the result of a single configuration change or the result of a plurality of configuration changes) are unknown. As a result, there may occur at least one problem, for example, a problem in that even if a failure occurred in the computer system due to any configuration change, a configuration change that caused the failure cannot be grasped and it takes time to handle the failure.

Such a problem is not limited to the case where the type of collection of information is a pull type such as polling, and may occur in the case of a push type in which a computer system provides information without any inquiry from a management system.

Solution to Problem

A management system holds a plurality of configuration information entries and a plurality of change information entries. Each of the plurality of configuration information entries is information which includes at least part of information included in information regularly collected from a computer system and information specified on the basis of first and second information collected from the computer system through first and second collection and which represents a change of the configuration of the computer system. Each of the plurality of change information entries is information which includes information manually input for the change of the configuration of the computer system and which represents the change of the configuration of the computer system. The management system associates at least one of the plurality of change information entries with at least one of the plurality of configuration information entries to manage the plurality of configuration information entries and the plurality of change information entries.

The type of collection may be either a pull type (information is received from a computer system in response to an inquiry from a management system) or a push type (information is received from a computer system without any inquiry from a management system). In the former case, the interval (cycle) of collection of information is a polling interval.

Advantageous Effects of Invention

Each of the plurality of configuration information entries is information based on information regularly collected, that is, information obtained from information mechanically collected. Thus, there is such completeness that the differences between the configuration at the collection start time and the configuration at the next collection start time can be all specified as configuration changes. On the other hand, each of the plurality of change information entries is information including information manually input. Thus, more detailed information on individual configuration changes are acquired. At least one of a plurality of configuration information entries is associated with at least one of a plurality of change information entries. Consequently, a user (for example, administrator) can know the details of the configuration change represented by mechanically acquired information.

BRIEF DESCRIPTION OF DRAWINGS

FIG. 3 illustrates the configuration of a node table.

FIG. 4 illustrates the configuration of a node detail table.

FIG. 5 illustrates the configuration of a component table.

FIG. 6 illustrates the configuration of a change event table.

FIG. 7 illustrates the configuration of a matching rule table.

FIG. 8 illustrates the configuration of a change table.

FIG. 9 illustrates the configuration of a matching table.

DESCRIPTION OF EMBODIMENTS

Figure 1:
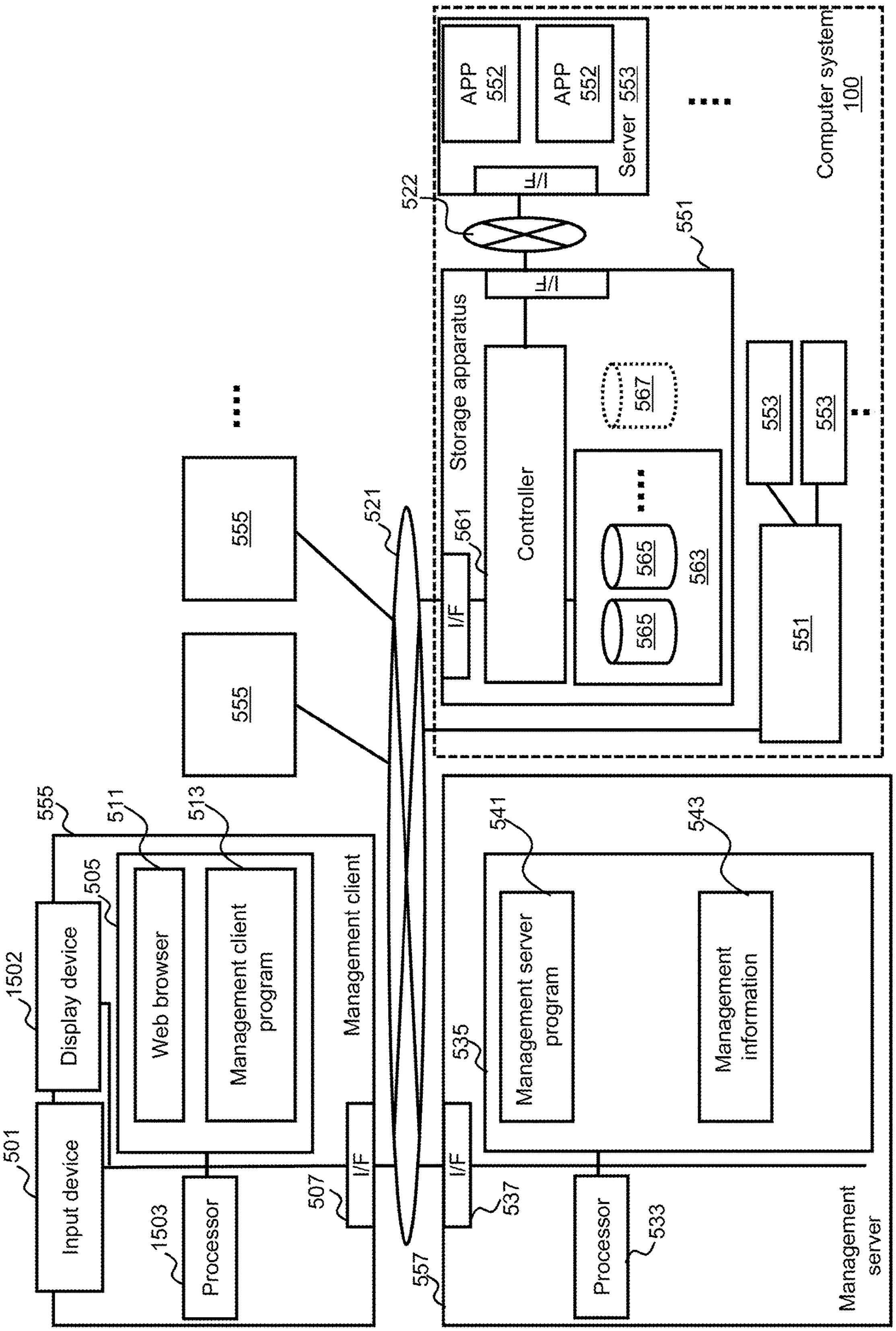
FIG. 1 illustrates the configurations of a computer system and a management system according to an embodiment.

In the following description, an "interface unit" includes one or more interfaces. One or more interfaces may be the same kind of one or more interface devices (for example, one or more NICs (Network Interface Cards)) or may be different kinds of two or more interface devices (for example, NIC and HBA (Host Bus Adapter)).

Further, in the following description, a "processor unit" includes one or more processors. At least one processor is typically a CPU (Central Processing Unit). A processor may include a hardware circuit that performs a part or whole of processing.

Further, in the following description, processing is sometimes described with a "program" being its subject. When executed by the processor unit, the program performs predetermined processing while appropriately using at least one of a storage unit and the interface unit, and hence the subject of the processing may be the processor unit (or a computer or a computer system having the processor unit). The program may be installed on a computer from a program source. The program source may be, for example, a program distribution server or a computer-readable recording medium. Further, in the following description, two or more programs may be implemented as a single program, or a single program may be implemented as two or more programs.

Further, in the following description, information is sometimes described with the expression "xxx table", but information can be expressed by any data structure. In other words, "xxx table" can be regarded as "xxx information" in order to indicate that information is independent from the data structure. Further, in the following description, the configuration of each table is an example, and one table may be divided into two or more tables or the whole or part of two or more tables may be one table.

Further, in the following description, reference symbols of elements (for example, event records 18A1, 18A2, . . . , 18B1, 18B2, . . . ) are sometimes used in order to distinguish the same type of elements, and only a common symbol among reference symbols of elements (for example, event record 18, 18A, or 18B) is sometimes used in order not to distinguish the same type of elements.

Further, in the following description, a management system may be configured by one or more computers. Specifically, for example, when a management computer displays information (specifically, when the management computer displays information on its own display device or the management computer transmits display information to a remote display computer), the management computer is a management system. Further, for example, when functions identical or similar to those of a management computer are implemented by a plurality of computers, the plurality of computers (may include a display computer if the display is performed by the display computer) are a management system. Information may be input to a computer or output from the computer by an input/output device included in the computer. Conceivable examples of the input/output device include a display device, a keyboard, and a pointing device, and another device may be employed in place of or in addition to at least one of these. Further, as an alternative to the input/output device, a serial interface device or an Ethernet interface device (Ethernet is trademark) may be employed. A display computer including a display device, a keyboard, and a pointer device may be coupled to such an interface device. The computer may transmit display information to the display computer, or the computer may receive input information from the display computer, thereby outputting (for example, displaying) and inputting information. In the following description, a management server 557 is a management computer, and a management client 555 is a display computer.

Further, in the following description, an "element" means a configuration element of a computer system, and is specifically the generic name of each of a plurality of nodes (devices) configuring a computer system and each of a plurality of components included in each node. Nodes include a physical node (for example, network switch) and a logical node (for example, virtual machine). Similarly, components include a physical component (for example, microprocessor) and a logical component (for example, volume (logical volume)).

Further, in the following description, at least one term of a "parent element", an "upper-level element", a "child element", and a "lower-level element" is sometimes used to mean the relation between elements. The "parent element" means an element at the next upper level than an element. The "upper-level element" means an element at an upper level than an element. Thus, the parent element is one of higher-level elements. The "child element" means an element that is at the next lower level than an element. The "lower-level element" means an element at a lower level than an element. Thus, the child element is one of lower-level elements. The relation between elements is relative, and hence whether each element is a "parent element", an "upper-level element", a "child element", or a "lower-level element" should depend on an element of interest.

Further, in the following description, a name or an ID is used as identification information. These may be replaced from each other, and another kind of identification information may be used in place of or in addition to at least one of these.

Further, in the following description, the collection of information from a computer system is a pull type, such as polling, or a push type. A start time of information collection is referred to as "polling time". Information is collected from each node in a computer system from the polling time (example of first collection start time) until the next polling time (example of second collection start time). Note that information may be collected by pull collection and push collection in a mixed manner. A node related to push collection may regularly provide information to a management system.

FIG. 1 illustrates the configurations of a computer system and a management system according to an embodiment.

A computer system 100 includes one or more servers 553 and one or more storage apparatuses 551 coupled to the one or more servers 553. For example, the server 553 is coupled to the storage apparatus 551 via a communication network 521 (for example, SAN (Storage Area Network) or LAN (Local Area Network)). For example, the communication network 521 may include a network switch as an example of a node.

The storage apparatus 551 includes a physical storage device group 563 and a controller 561 coupled to the physical storage device group 563.

The physical storage device group 563 has one or more PGs (Parity Groups). The PG is sometimes called "RAID (Redundant Array of Independent (or Inexpensive) Disks) group". The PG is constructed by a plurality of physical storage devices, and stores data in accordance with a predetermined RAID level. For example, the physical storage device is an HDD (Hard Disk Drive) or an SSD (Solid State Drive).

The storage apparatus 551 has a plurality of logical volumes. Examples of the logical volumes include a substantial logical volume (real volume) 565 based on PG and a virtual logical volume (virtual volume) 567 conforming to thin provisioning or storage virtualization technology. One storage apparatus 551 is not necessarily required to have a plurality of types of logical volumes. For example, the storage apparatus 551 may have only a real volume 565 as a logical volume. A virtual volume conforming to thin provisioning is allocated with a storage area from a pool. The pool is a storage area group based on one or more physical storage devices (for example, PGs), and may be, for example, a set of one or more logical volumes. The pool may be a pool in which a difference between an original logical volume and its snapshot is stored, instead of a pool having a storage area allocated to a virtual volume conforming to thin provisioning.

The controller 561 includes a plurality of devices, such as a port, an MPB (blade (circuit board) having one or a plurality of microprocessors (MPs)), and a cache memory. For example, the port receives an I/O (Input/Output) command (write command or read command) from the server 553, and the MP in the MPB controls the I/O of data in accordance with the I/O command. Specifically, for example, the MP specifies a logical volume at an I/O destination from a received I/O command, and performs I/O of data to and from the specified logical volume. Data to be input and output to and from the logical volume is temporarily stored in a cache memory.

The server 553 may be a physical computer or a virtual computer (virtual machine (VM)). On the server 553, one or more application programs (APPs) 552 are executed. When an APP 552 is executed, an I/O command that designates a logical volume is transmitted from the server 553 to the storage apparatus 551.

As described above, the computer system 100 has a plurality of tiered elements. Specifically, the plurality of elements include elements of two or more element types among the APPs 552, the servers 553, the storage apparatus 551, the controller 561, the port, the MPB, the cache memory, the logical volumes, and the PGs. A plurality of elements on the same layer may be grouped to define an element on a layer upper than elements on the layer. "Elements" may include substantial elements such as APPs and logical volumes and virtual elements that are a group of a plurality of substantial elements.

The management system includes a management server 557 and one or more management clients 555 coupled to the management server 557. The management client 555 is coupled to the management server 557 via a communication network (for example, LAN, WAN (World Area Network), or Internet) 521.

The management client 555 includes an input device 501, a display device 1502, a storage device (for example, memory) 505, a communication interface device (hereinafter I/F) 507, and a processor (for example, CPU (Central Processing Unit)) 503 coupled to these components. For example, the input device 501 is a pointing device and a keyboard. For example, the display device 1502 is a device having a physical screen on which information is displayed. A touch screen in which the input device 501 and the display device 1502 are integrated may be employed. The I/F 507 is coupled to the communication network 521, and the management client 555 can communicate with the management server 557 via the I/F 507. Note that the communication network 521 and a network that couples the server 553 and the storage apparatus 551 may be common in part or entirety.

For example, the storage unit 505 has at least a primary storage device (typically, memory) and an auxiliary storage device. The storage unit 505 can store computer programs to be executed by the processor 1503 and information to be used by the processor 1503. Specifically, for example, the storage unit 505 stores a Web browser 511 and a management client program 513. The management client program 513 may be an RIA (Rich Internet Application). Specifically, for example, the management client program 513 is a program file, and may be downloaded from the management server 557 (or another computer) and stored in the storage unit 505.

The management server 557 includes a storage unit 535, an I/F 537, and a processor (for example, CPU (Central Processing Unit)) 533 coupled thereto. The I/F 537 is an example of an interface unit. The I/F 537 is coupled to the communication network 521, and the management server 557 can communicate with the management client 555 via the I/F 537. The management server 557 can receive an instruction according to a user operation and display information via the I/F 537.

For example, the storage unit 535 has at least a primary storage device (typically, memory) out of the primary storage device and an auxiliary storage device. The storage unit 535 can store computer programs to be executed by the processor 533 and information to be used by the processor 533. Specifically, for example, the storage unit 535 stores a management server program 541 and management information 543. The management information 543 includes information representing a tiered relation of a plurality of elements included in the computer system and failure information on each element. At least part of the management information 543 may be collected by the management server program 541. The management server program 541 receives an instruction according to a user operation from the management client 555, and transmits display information to the management client 555. Further, the management server program 541 performs matching determination between an event record described later and a change record described later (details are described later). The processor 533 is an example of a processor unit. Display corresponding to a user operation may be implemented by cooperative processing of the management server program 541, the Web browser 511 (or client RIA execution environment), and the management client program 513.

Note that, in FIG. 1, only one management server 557 and one management client 555 are illustrated for the ease of description. A plurality of management servers 557 and a plurality of management clients 555 may exist. For example, as management servers 557, a first management server (configuration management server) that collects information from the computer system 100 and accumulate event records described later and a second management server (IT process management server) that receives a manual input for a configuration change of the computer system 100 from a user (for example, person who makes a change) and accumulate change records described later may exist. Similarly, as the management client 555, a first management client (management client for configuration management) that communicates with a first management server and a second management client (management client for IT process) that communicates with a second management server may exist. The number of at least one of the first management server, the second management server, the first management client, and the second management client may be plural.

Figure 2:
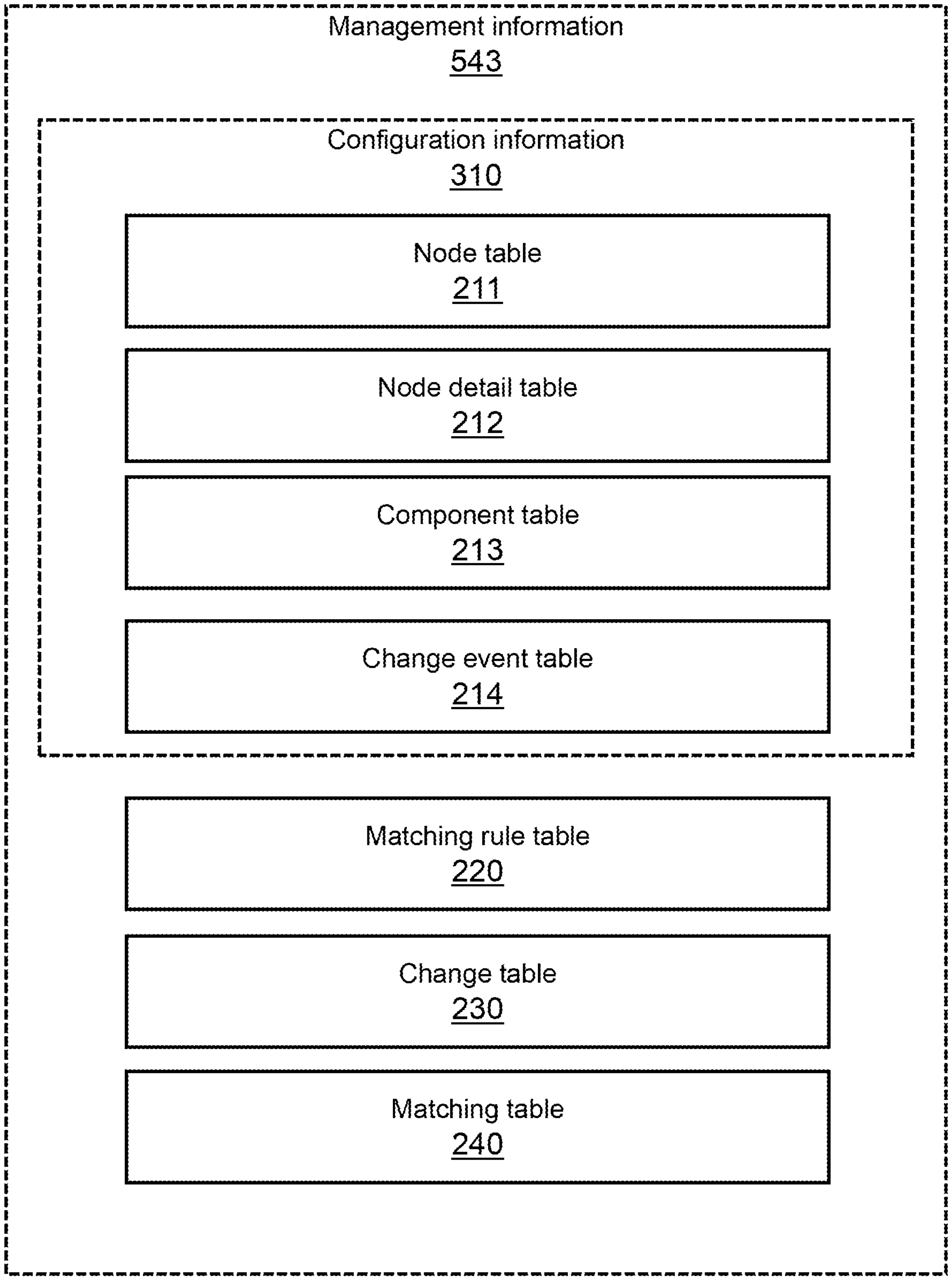
FIG. 2 illustrates the configuration of management information.

FIG. 2 illustrates the configuration of the management information 543.

The management information 543 includes configuration information 310, a matching rule table 220, a change table 230, and a matching table 240. The configuration information 310 includes a node table 211, a node detail table 212, a component table 213, and a change event table 214.

FIG. 3 illustrates the configuration of the node table 211.

The node table 211 is a table that holds information on nodes. The node table 211 has a record for each node. Each record holds information such as a node ID 301, a node type 302, and a polling time 303.

The node ID 301 is an identifier for uniquely identifying a node. The node type 302 represents the type of a node. Examples of the node type include a server computer (SERVER), a storage apparatus (STORAGE), and a fibre channel switch (FCSWITCH). The fibre channel switch is an example of a network apparatus. The polling time 303 is a start time of collection of record information.

FIG. 4 illustrates the configuration of the node detail table 212.

The node detail table 212 is a table that holds detailed information on a node. The node detail table 212 has a record for each node. Each record holds information such as a node ID 401, a node name 402, an OS name 403, a memory capacity 404, a CPU 405, a disk capacity 406, an IP address 407, and a polling time 408.

The node ID 401 is an identifier for uniquely identifying a node. The node name 402 is the name of a node. The OS name 403 is the name of an OS (Operating System) that is executed on a node. The memory capacity 404 is the capacity of a memory of a node. The disk capacity 406 is the capacity of a disk of a node. The IP address 407 is an IP address allocated to a node, and is used to collect information from the node. The polling time 408 is a start time of collection of record information.

The management server program 541 collects information from the computer system 100 at polling intervals, and in this case, the IP address of a node is used to collect information from the node. Further, information to be acquired at polling intervals includes: (a) information on an infrastructure element (example of element); (b) information on a component (example of element) configuring the infrastructure element; (c) information on the infrastructure element or the component; and (d) information representing the relevance between the infrastructure element and the component. Specific examples of the information (a) include information on a hypervisor, a virtual machine, a storage apparatus, and the like. Specific examples of the information (b) include, when the infrastructure element is a hypervisor, information on a physical or virtual CPU, a memory, an NIC, a disk, and the like managed by the hypervisor. Specific examples of the information (c) include information on a vendor name, an OS name, a server name, a memory capacity, a CPU clock count, and the like. Specific examples of the information (d) include information on a coupling relation between the hypervisor and the virtual machine and a coupling relation between the hypervisor and the storage apparatus. On the basis of collected information, a record is added, deleted, or changed for at least one of the tables 211 to 214.

FIG. 5 illustrates the configuration of the component table 213.

The component table 213 is a table that holds information on components at a node. The component table 213 has a record for each component. Each record holds information such as a component ID 501, a component type 502, a component name 503, and a parent node ID 504.

The component ID 501 is an identifier for uniquely identifying a component. The component type 502 is the type of a component. Examples of the component type include a LAN adapter (LAN_ADAPTER), an ISCSI disk (ISCSI_DISK), an application (APPLICATION), and the like. The component name 503 is the name of a component. The parent node ID 504 is an identifier of a node having a component (parent element of component).

FIG. 6 illustrates the configuration of the change event table 214.

The change event table 214 is a table that holds information on events (configuration changes) that have occurred in a polling interval. The change event table has a record for each event. The record in the change event table is hereinafter sometimes referred to as “event record”. Each event record is an example of a configuration information entry. Each event record holds information such as an event ID 601, a node ID 602, a component ID 603, an event type 604, a change content 605, a previous polling time 606, and a current polling time 607.

The event ID 601 is an identifier for uniquely identifying an event. The node ID 602 is an identifier of a node related to an event. The component ID 603 is an example of a detected element ID, and is an identifier of a component related to an event. The event type 604 is the type of an event. Examples of the event type include change, addition, and deletion of a component. The change content 605 is a content of a change performed for a component, and is, specifically, for example, a content obtained from a difference between information X (example of first information) that is information collected at the previous polling time and information Y (example of second information) that is information collected at the current polling time. The previous polling time 606 represents the previous polling time, which is a polling time of polling in which the information X that is the basis of the configuration change represented by the record is collected. The previous polling time is an example of a first collection start time. The current polling time 607 represents the current polling time, which is a polling time of polling in which the information Y that is the basis of the configuration change represented by the record is collected. The current polling time is an example of a second collection start time.

In the case where the current polling time is a polling time in N-th polling (N is an integer of 2 or more), the previous polling time is a polling time of (N−1)th polling. A configuration change represented by an event record added by the management server program 541 in the N-th polling is a configuration change represented by a difference between second information collected by the N-th polling and first information collected by the (N−1)th polling. The management server program 541 can specify the difference between the first information and the second information by comparing the second information and the first information.

FIG. 7 illustrates the configuration of the matching rule table 220.

The matching rule table 220 is a table that holds information on matching rules. The matching rule table 220 has a record for each matching rule. The record in the matching rule table 220 is sometimes referred to as “matching rule record”. Each matching rule record holds information such as a rule ID 701, a target component type 702, a virtual change record creation method 703, and a change type 704.

The rule ID 701 is an identifier for uniquely identifying a matching rule. The target component type 702 is information for specifying change record (described later) to which a matching rule is applied, and is the type of a component to which the configuration change represented by the change record is executed. The virtual change record creation method 703 represents a method of creating a virtual change record, and examples of the type thereof include “join”, “division”, and “division and join”. The change type 704 is information for specifying a change record to which a matching rule is applied, and is the type of a change. Examples of the change type include “addition”, “deletion”, and “addition and deletion” of a component.

FIG. 8 illustrates the configuration of the change table 230.

The change table 230 is a table that holds information on configuration changes. The change table 230 has a record for each configuration change. The record in the change table 230 is sometimes referred to as “change record”. Each change record holds information such as a change ID 801, a component ID 802, a change type 803, a change content 804, and a change detail 805. At least the change detail 805 among the component ID 802, the change type 803, the change content 804, and the change detail 805 is information that has been manually input. The manual input may be a text input, or inputs according to various kinds of methods including the selection from a menu such as a pull-down menu.

The change ID 801 is an identifier allocated to a change record. The component ID 802 is an identifier of a component whose configuration has been changed. The change type 803 is the type of the changed configuration. Examples of the change type include “change”, “addition”, and “deletion”. The change content 804 is a specific content of the configuration change. The change detail 805 is information related to a configuration change represented by the change record, and is information that is unspecifiable from information collected at a previous polling time that is the same as or older than a time of the configuration change represented by the change record and at the next earlier current polling time. Specifically, for example, the change detail 805 includes a change time 811 among the change time 811, a title 812, a person who makes a change 813, and an event ID 814. The change time 811 is a time at which the configuration was changed. The title 812 is the title of the configuration change. The person who makes a change 813 is an ID of a person who changed the configuration. The event ID 814 is an identifier of an event serving as a configuration change represented by the change record. The change detail 805 may include, in place of or in addition to at least one of items other than the change time 811, an item (information) representing at least one of a purpose of the configuration change, a result of the configuration change, a degree of importance of the configuration change, a cost of the configuration change, an influence of the configuration change, an examination content as to whether to make a configuration change, or a relation with another configuration change (another change record).

FIG. 9 illustrates the configuration of the matching table 240.

The matching table 240 is a table that holds information on record association, that is, the association between an event record and a change record. The matching table holds a record for each record association. A record held by the matching table is hereinafter sometimes referred to as “matching record”. Each matching record holds information such as an event ID 901 and a change ID 902. The event ID 901 is an identifier for uniquely identifying an event record. The change ID 902 is an identifier for uniquely identifying a change record. In one matching record, the number of each of the event ID and the change ID may be one or plural, but typically, one event ID and one or a plurality of change IDs are held.

Some examples of processing performed in this embodiment are described below.

Figure 10:
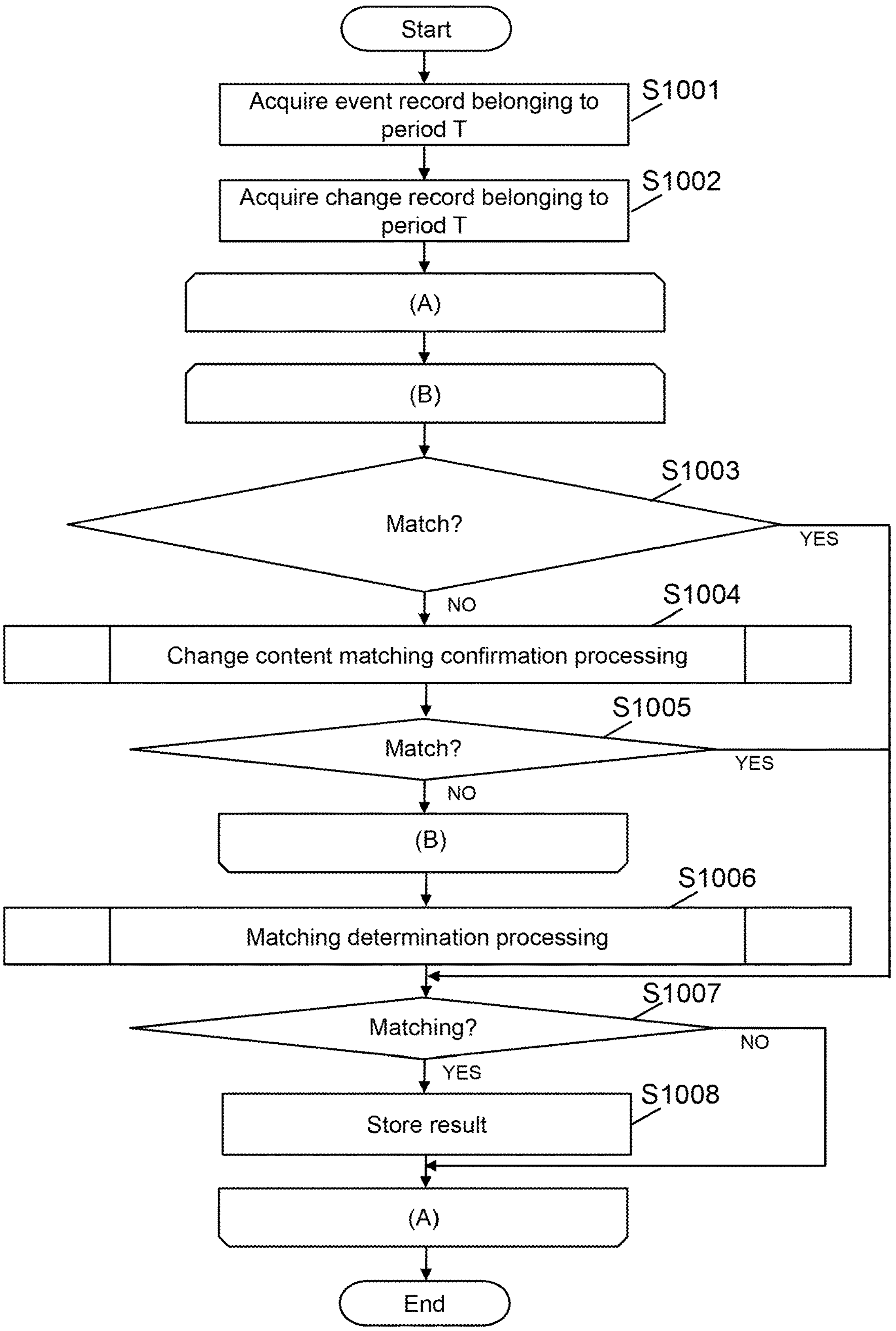
FIG. 10 illustrates the flow of matching whole processing.

FIG. 10 illustrates the flow of matching whole processing.

The matching whole processing is processing for associating a change record to an event record, specifically, processing for creating matching records.

The management server program 541 acquires event records belonging to a period T from the change event table 214 (S1001), and acquires change records belonging to the period T from the change table 230 (S1002). The “period T” is a period subjected to matching. The period T may be a period designated by a user (for example, administrator). The period T is one or more polling periods. Each polling period is a period from the previous polling time until the next current polling time (excluding the current polling time). An “event record belonging to the period T” is an event record including a previous polling time 606 and a current polling time 607 representing the polling period included in the period T. A “change record belonging to the period T” is a change record including a change time 811 representing a time included in the period T.

A loop A is performed on all event records acquired in S1001. A loop B is performed on all change records acquired in S1002. Now, one event record (“target event record” in the description with reference to FIG. 10 to FIG. 15) and one change record (“target change record” in the description with reference to FIG. 10 and FIG. 11) are taken as an example.

The management server program 541 determines whether an event ID 601 in a target event record and an event ID 814 in a target change record match with each other (S1003).

When the determination result in S1003 is true (S1003: YES), S1007 (determination whether the IDs are matched) is performed. Note that, in this case, the determination result in S1007 is also true (S1007: YES), the management server program 541 registers the event ID 601 in the target event record and the change ID 801 in the target change record in a matching record of the matching table 240 as an event ID 901 and a change ID 902, respectively (S1008).

When the determination result in S1003 is false (S1003: NO), the management server program 541 executes change content matching confirmation processing (S1004).

When the change content 605 in the target event record and the change content 804 in the target change record match with each other as a result of S1004 (S1005: YES), the management server program 541 performs S1007 (determination whether the contents are matched). Note that, in this case, the determination result in S1007 is also true (S1007: YES), the management server program 541 registers the event ID 601 in the target event record and the change ID 801 in the target change record in a matching record of the matching table 240 as an event ID 901 and a change ID 902, respectively (S1008).

When the change content 605 in the target event record and the change content 804 in the target change record do not match with each other as a result of S1004 (S1005: NO), after the loop B is finished (that is, after steps until S1005 are performed on all change records acquired in S1002), the management server program 541 executes the matching determination processing (S1006).

After S1003: YES, S1005: YES, or S1006, the management server program 541 executes S1007 (determination whether the matching has occurred). When the determination result in S1007 is true (S1007: YES), the management server program 541 registers the event ID 601 in the target event record and one or more change IDs 801 in one or more change records that have been determined to match with the target event record in a matching record of the matching table 240 as an event ID 901 and a change ID 902, respectively.

Figure 11:
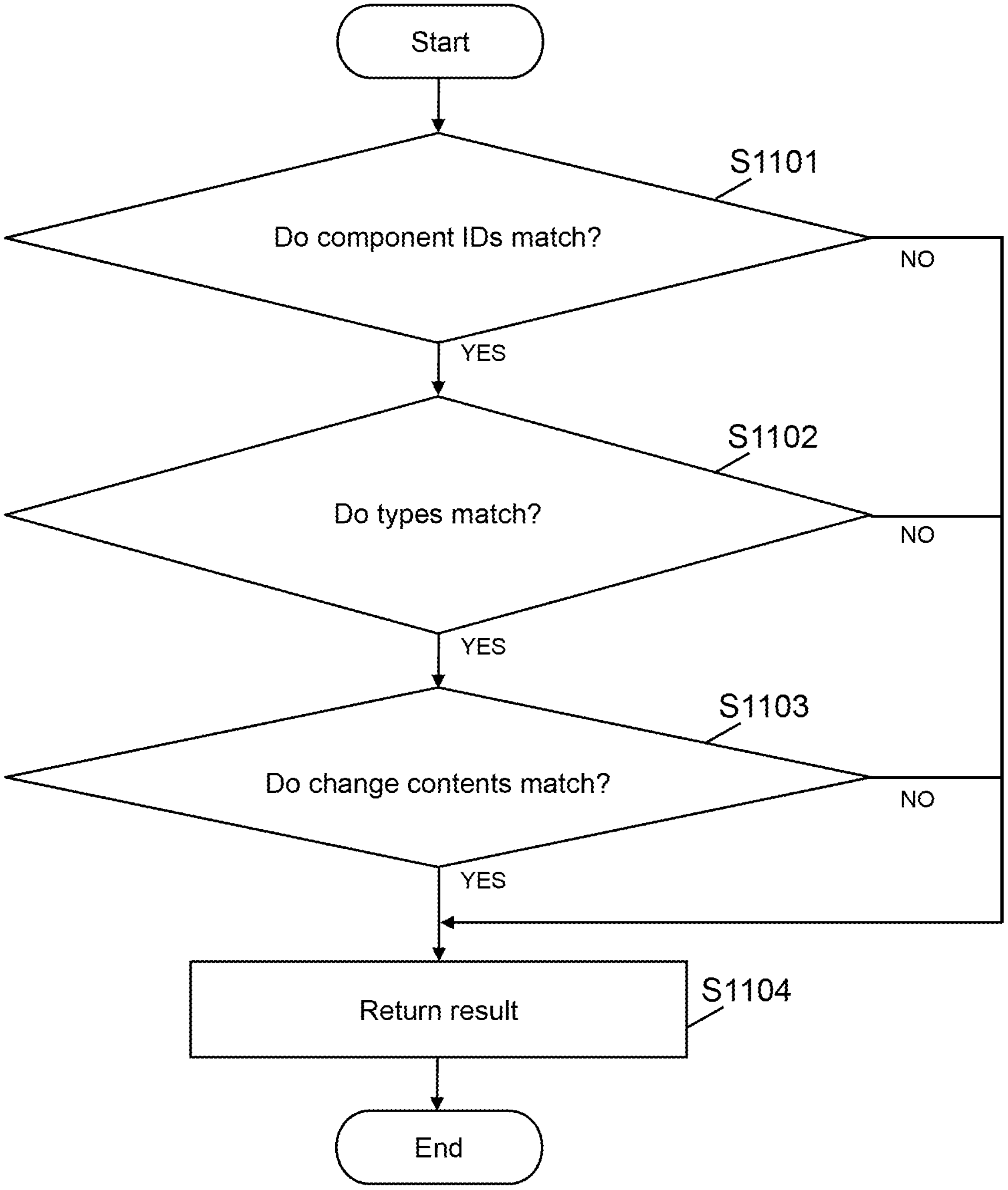
FIG. 11 illustrates the flow of change content matching confirmation processing.

FIG. 11 illustrates the flow of change content matching confirmation processing (S1004 in FIG. 10).

The management server program 541 determines whether a component ID 603 in the target event record and a component ID 802 in the target change record match with each other (S1101).

When the determination result in S1101 is true (S1101: YES), the management server program 541 determines whether an event type 604 in the target event record and a change type 803 in the target change record match with each other (S1102).

When the determination result in S1102 is true (S1102: YES), the management server program 541 determines whether a change content 605 in the target event record and a change content 804 in the target change record match with each other (S1103).

When the determination result in S1103 is true (S1103: YES), the management server program 541 returns the result of matching (S1104). On the other hand, when any one of the determination results in S1101 to S1103 is false, the management server program 541 returns the result of mismatching (S1104).

Figure 12:
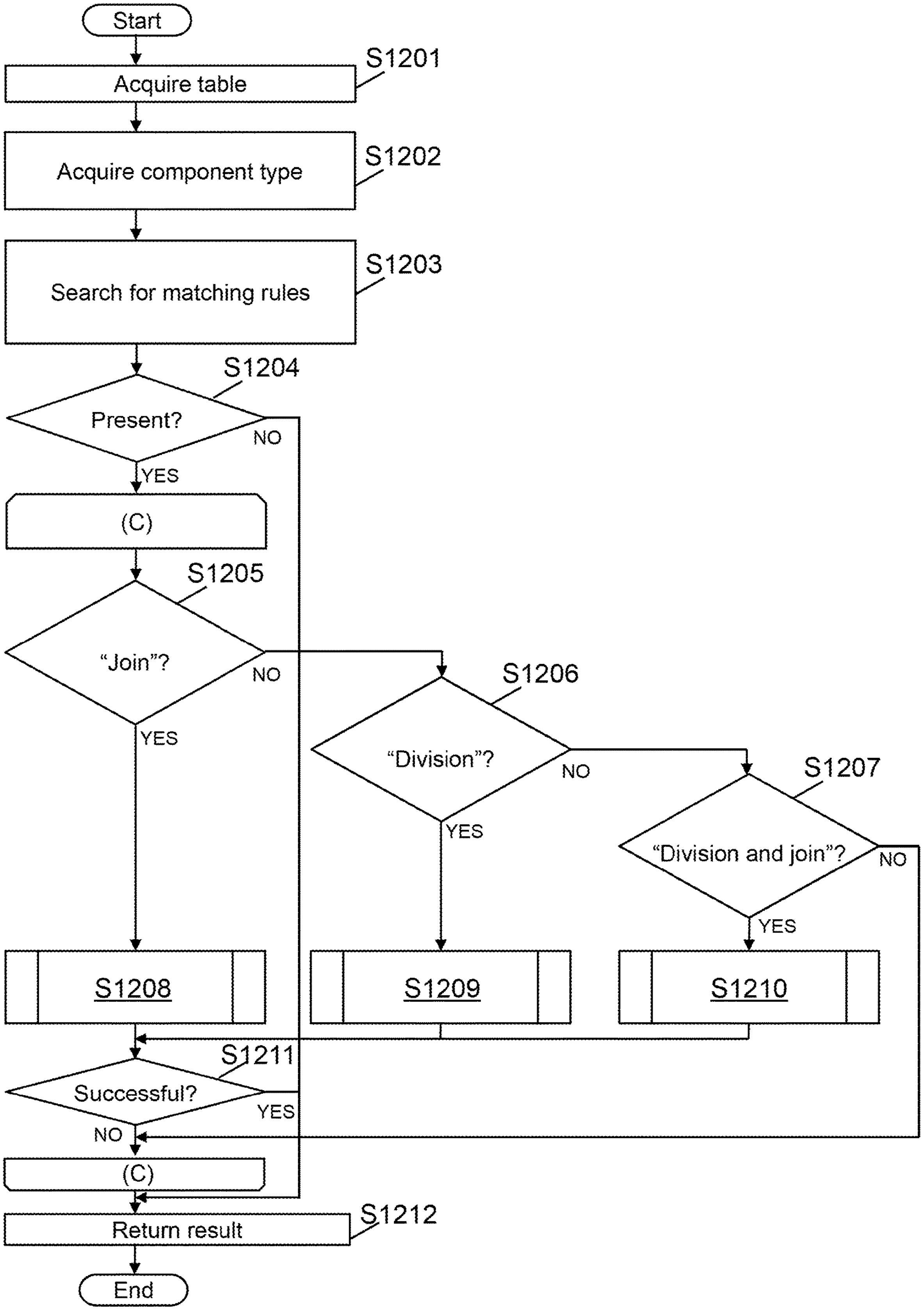
FIG. 12 illustrates the flow of matching determination processing.

FIG. 12 illustrates the flow of matching determination processing (S1006 in FIG. 10).

The management server program 541 acquires the matching rule table 220 (S1201), and acquires a component type 502 corresponding to a component ID 603 in a target event record from the component table 213 (S1202). Specifically, for example, when the target event record is an event record including an event ID “E2”, the component ID 603 is “Server2/Memory2” (see FIG. 6). A component type 502 corresponding to this component ID 603 is “MEMORY” (see FIG. 5).

The management server program 541 searches the matching rule table 220 for a matching rule record corresponding to the target component type 702 that matches with the acquired component type 502 (S1203). For example, when the acquired component type 502 is “MEMORY”, the matching rule records corresponding to the target component type 702 “MEMORY” are three matching rule records including “R2”, “R3”, and “R4” as rule IDs 701, respectively (see FIG. 7).

When there are no matched matching rule records as a result of S1203 (S1204: NO), the management server program 541 returns a matching failure (S1212).

When there is a matched matching rule record that matches as a result of S1203 (S1204: YES), the management server program 541 executes a loop C for all the matched matching rule records. Now, one matching rule record (“target rule record” in the description with reference to FIG. 12 to FIG. 15) is taken as an example.

When the virtual change record creation method 703 in the target rule record is “join” (S1205: YES), the management server program 541 executes join matching processing (S1208). For example, when the target rule record is a record including a rule ID 701 of “R1”, the join matching processing is executed because the virtual change record creation method 703 is “join”.

When the virtual change record creation method 703 in the target rule record is “division” (S1205: NO, S1206: YES), the management server program 541 executes division matching processing (S1209). For example, when the target rule record is a record including a rule ID 701 of “R2”, the division matching processing is executed because the virtual change record creation method 703 is “division”.

When the virtual change record creation method 703 in the target rule record is “division and join” (S1205: NO, S1206: NO, S1207: YES), the management server program 541 executes division and join matching processing (S1210). For example, when the target rule record is a record including a rule ID 701 of “R4”, the division and join matching processing is executed because the virtual change record creation method 703 is “division and join”.

When matching is successful in any of the matching processing in S1208, S1209, and S1210 (S1211: YES), the management server program 541 returns a matching success for the target event record (S1212). On the other hand, when matching has failed for any matched matching rule records for the target event record, the management server program 541 returns a matching failure for the target event record (S1212).

Figure 13:
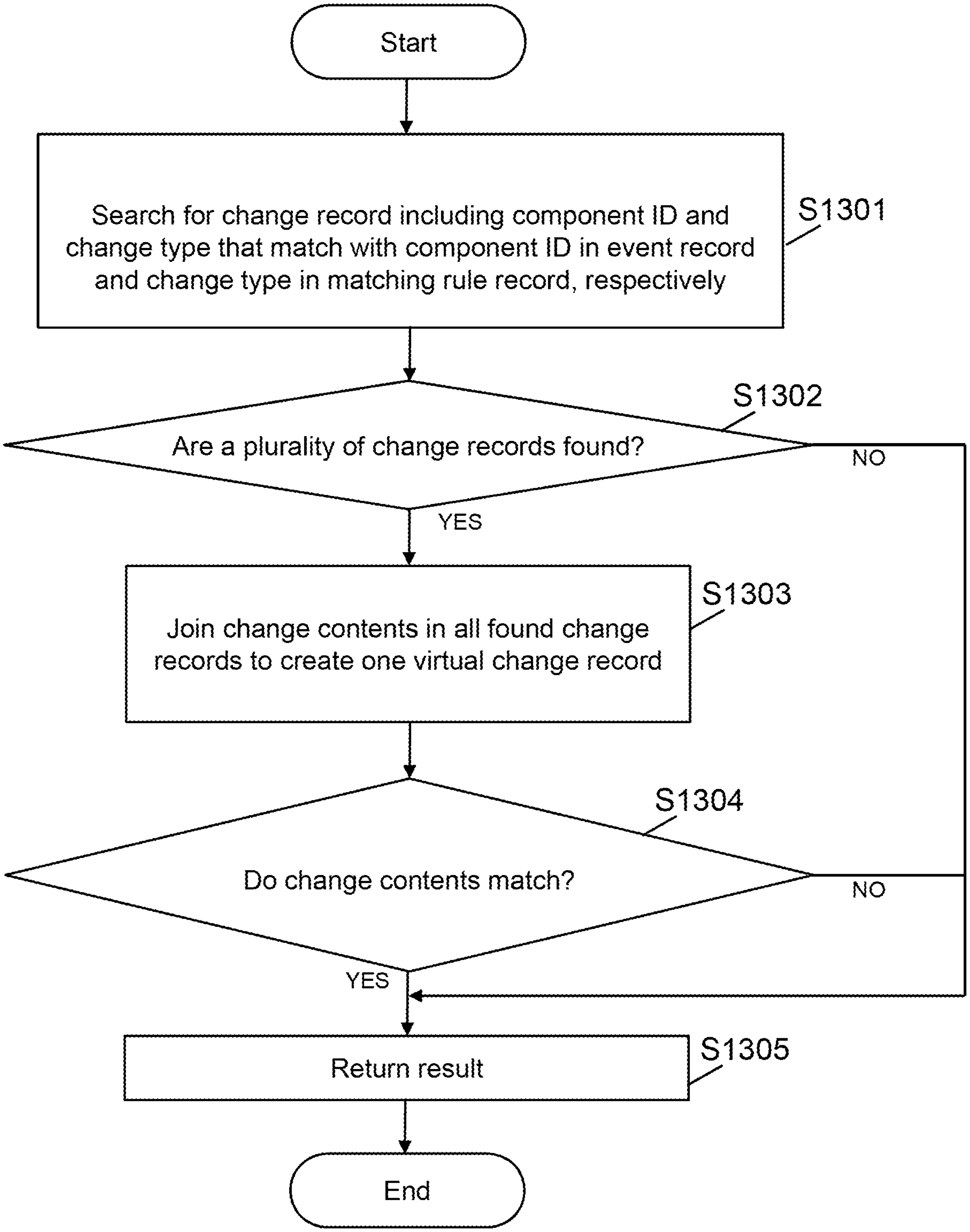
FIG. 13 illustrates the flow of join matching processing.

FIG. 13 illustrates the flow of join matching processing.

The management server program 541 searches for a change record including a component ID 802 and a change type 803 that matches with a component ID 603 in the target event record and a change type 704 in the target rule record, respectively (S1301).

When a plurality of change records have not been found as a result of S1301 (S1302: NO), the management server program 541 returns a matching failure (S1305).

When a plurality of change records have been found as a result of S1301 (S1302: YES), the management server program 541 joins the change contents 804 in all the found change records to create one virtual change record (S1303). For example, when there are a change record indicating the addition of 500 GB to a disk of "Server1/iSCSI Disk1" and a change record indicating the addition of 1 TB to the same disk, the management server program 541 joins 500 GB and 1 TB to create one virtual change record indicating the addition of 1.5 TB to the disk of Server1/iSCSI Disk1. In other words, the change content 804 of "addition of 500 GB" in the first change record and the change content 804 "addition of 1 TB" in the second change record are joined to create one virtual change record including the change content of "addition of 1.5 TB". According to this aspect, the configuration including the content type such as "addition" and "deletion" and parameters (numerical values) such as "500 GB" and "1 TB" can be employed as the configuration of the change content 804 in the change record. A plurality of parameters corresponding to the same content type can be joined (for example, added).

After that, the management server program 541 determines whether the change content 605 in the target event record and the change content in the virtual change record created in S1303 match with each other (S1304). When the determination result in S1304 is false (S1304: NO), the management server program 541 returns a matching failure (S1305). When the determination result in S1304 is true (S1304: YES), the management server program 541 returns a matching success (S1305).

Figure 14:
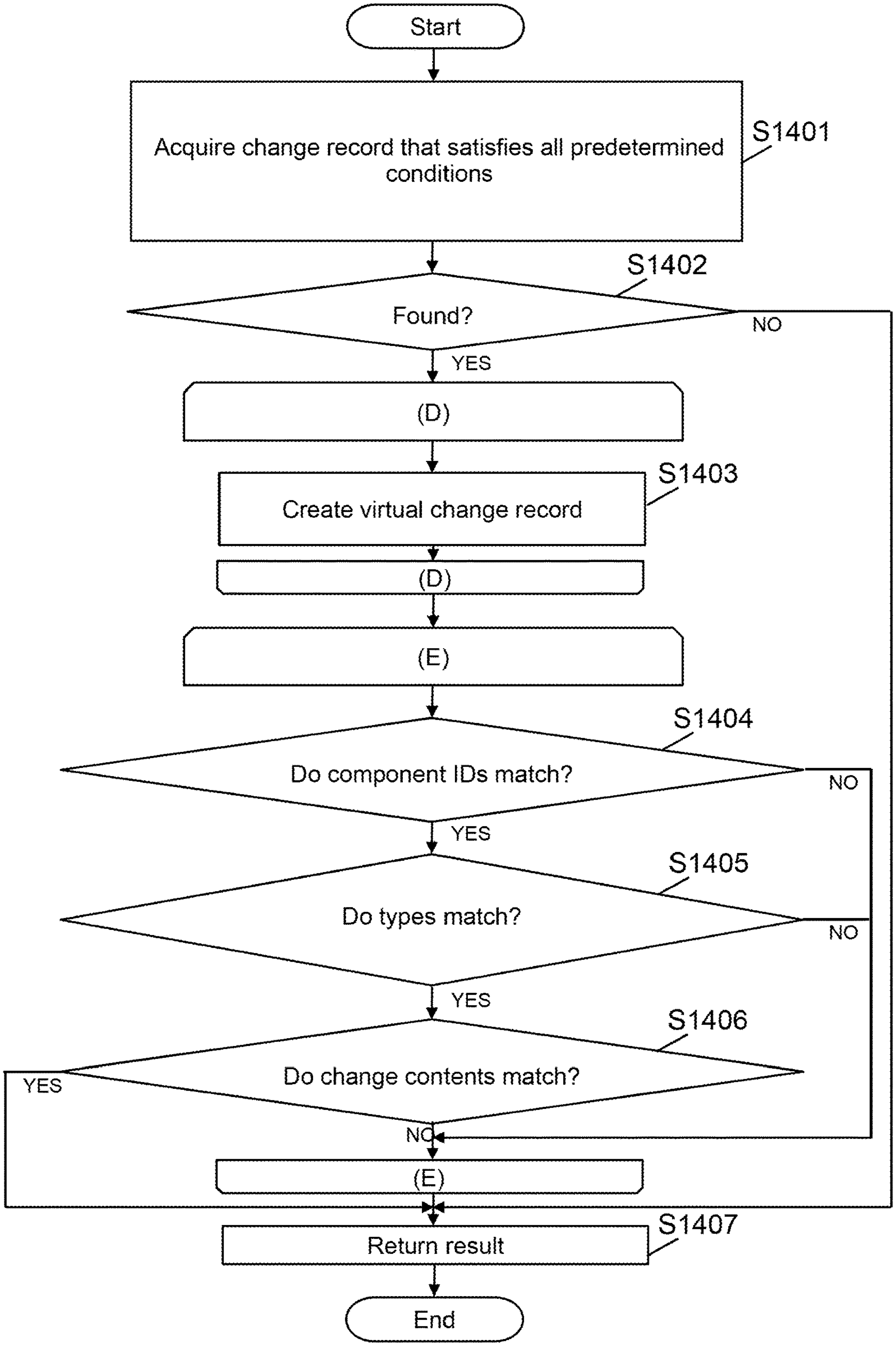
FIG. 14 illustrates the flow of division matching processing.

FIG. 14 illustrates the flow of division matching processing.

The management server program 541 acquires change records that satisfy all the following conditions (S1401).

- Change record including a plurality of identifiers as component IDs 802.
- Change record including a component ID 802 that includes an identifier matching with a component ID 603 in a target event record.
- Change record including a change type 803 that includes a type matching with a type represented by a change type 704 in a target rule record.

When no change record has been acquired in S1401 (S1402: NO), the management server program 541 returns a matching failure (S1407).

When one or more change records have been acquired in S1401 (S1402: YES), a loop D is performed for all the acquired change records. Now, one change record ("target change record" in the description with reference to FIG. 14) is taken as an example. Note that, for example, when a target event record is an event record including an event ID 601 of "E3", a change record that satisfies the above-mentioned conditions is a change record including a change ID 801 of "CI3" (see FIG. 6 and FIG. 8).

The management server program 541 creates a virtual change record (S1403) for each of a plurality of change contents corresponding to a plurality of identifiers included in the component ID 802 in the target change record (a plurality of change contents in the change content 804). The configuration of the virtual change record is the same as the configuration of the change record. Specifically, the virtual change record includes the same items as the items included in the change record. For example, when the target change record is a change record including a change ID 801 of "CI3", the management server program 541 creates a virtual change record indicating that 8 G has been added to "Server2/Memory3" and a virtual change record indicating that 8 G has been deleted from "Server3/Memory2". After that, a loop E is performed for all the created virtual change records. Now, one virtual change record ("target virtual change record" in the description with reference to FIG. 14) is taken as an example. S1404 to S1406 in the loop E are identical or similar processing to S1101 to S1103 in FIG. 11.

Specifically, the management server program 541 determines whether the component ID 603 in the target event record and the component ID in the target virtual change record match with each other (S1404).

When the determination result in S1404 is true (S1404: YES), the management server program 541 determines whether the event type 604 in the target event record and the change type in the target virtual change record match with each other (S1405).

When the determination result in S1405 is true (S1405: YES), the management server program 541 determines whether the change content in the target event record and the change content in the target virtual change record match with each other (S1406).

When the determination result in S1406 is true (S1406: YES), the management server program 541 returns the result indicating that the matching has been successful (S1407).

Figure 15:
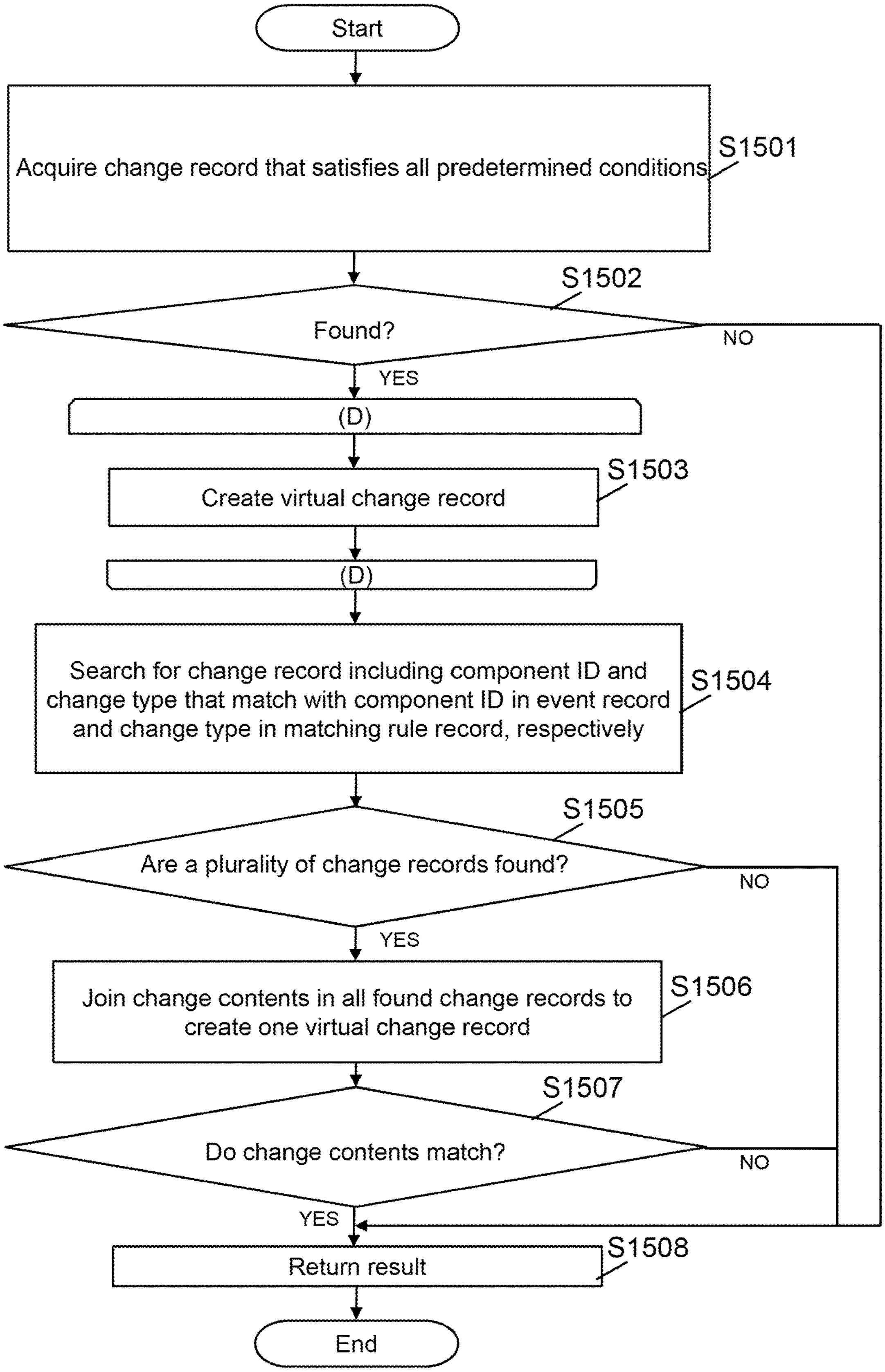
FIG. 15 illustrates the flow of division and join matching processing.

FIG. 15 illustrates the flow of division and join matching processing.

S1501 to S1503 are performed. S1501 to S1503 are identical or similar to S1401 to S1403 in FIG. 14, respectively.

After that, S1504 to S1508 are performed. S1504 to S1508 are identical or similar to S1301 to S1305 in FIG. 13. Note that, in S1504 to S1508, the "change record" is any one of the change record and the virtual change record. Further, in S1508, a matching success or a matching failure is returned instead of matching or unmatching.

Now, the embodiment is summarized with reference to the drawings, and the like. Note that, in the following description, a modification of the embodiment and the like may be described as appropriate.

The management server program 541 collects information on the configuration from the computer system 100 at a polling interval. The management server program 541 compares information collected in the current polling period and information collected in the previous polling period. When there is a difference between these pieces of information, the management server program 541 can create one or more event records (example of configuration information entry) corresponding to one or more configuration changes specified from the difference. Instead of comparing the information collected in the current polling period and the information collected in the previous polling period, the collected information may include information corresponding to an event record, and at least part of the information may be registered as at least part of the event record. The specified configuration change can be used for the investigation and the specification of the influence range in case of occurrence of a failure in the computer system 100.

In general, when the computer system 100 is large in scale or complicated, the influence range of a failure is wide and it is difficult to specify the cause of the failure. In recent years, for example, the computer system is increased in scale or complicated due to at least one of the following factors.

- Processing to be handled in the computer system is increased in scale.
- Much processing as represented by a cloud service executed by the computer system.
- The number of types of nodes in the computer system is increased.

The internal configuration of the node is complicated, and the number of types of components configuring the node (for example, logical components and physical components) is increased. Further, it is necessary to manage these.

Virtualization technology (for example, server virtualization, network virtualization, storage virtualization, and datacenter virtualization) becomes widespread, and devices can be divided or aggregated.

Deployment and migration technology has been advanced.

"Being increased in scale" refers to an increase in number of elements to be managed in the computer system, such as nodes configuring the computer system and components of the nodes. Further, "being complicated" refers to at least one of a fact that the relation among elements becomes M:1, 1:N, or M:N (M and N are each an integer of 2 or more) due to an increase in number of types of elements to be managed, a fact that the value of at least one of M and N is increased, and a fact that the relation among elements changes from hour to hour.

The polling interval is determined on the basis of the scale of the computer system 100 (specifically, the amount of information depending on the scale of the computer system 100 (amount of information to be collected)). Depending on the scale of the computer system 100, the polling interval is set to a long interval (for example, "1 day"). This is because it takes long time to perform polling once (information collection).

When the polling interval is long, the configuration of a computer system may be changed a plurality of times during a certain polling period.

Figure 16:
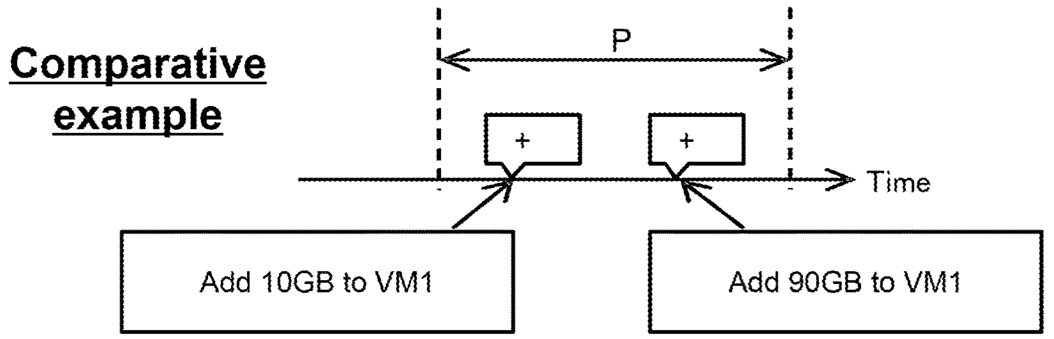
FIG. 16 illustrates an example of an actual configuration change according to one comparative example.
Figure 17:
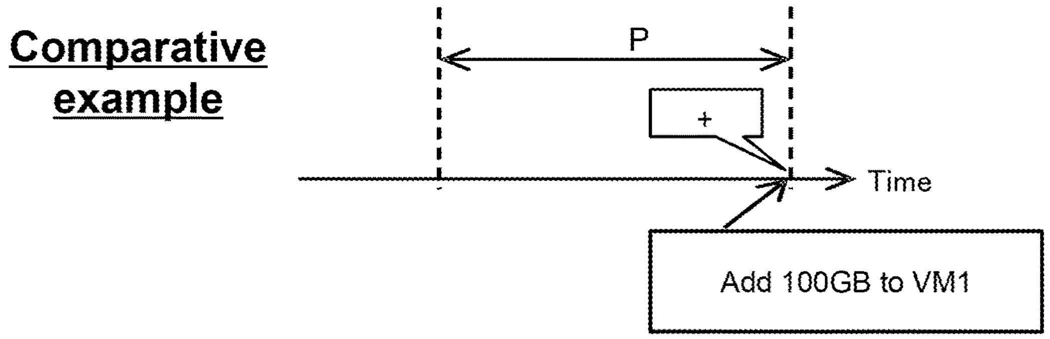
FIG. 17 illustrates an example of a configuration change detected in one comparative example.

According to one comparative example, the configuration change can be detected from a comparison between information collected in the current polling period and information collected in the previous polling period, but the details of the detected configuration change (for example, whether the detected configuration change is the result of a single configuration change or the result of a plurality of configuration changes) are unknown. For example, as exemplified in FIG. 16, even when the capacity of VM1 (virtual machine 1) has been changed a plurality of times in a certain polling period P as a configuration change (for example, even when the capacity has been added twice, such as the addition of 10 GB and the addition of 90 GB), it is recognized that the capacity has been changed once (it is recognized that the capacity was added once by 100 GB) as exemplified in FIG. 17. As a result, even if a failure has occurred due to any configuration change of the plurality of configuration changes, the configuration change as the cause of the failure cannot be specified. Even when the configuration change as the cause of the failure can be specified, the details of the configuration change are unknown. From these reasons, one comparative example has a problem in that it takes time to handle a failure.

Meanwhile, when the configuration has been changed, a user (for example, a person who made a change (person who changed the configuration)) registers a change record (example of change information entry) in a management server (for example, IT process management server out of configuration management server and IT process management server). Specifically, the user manually inputs information on details of the configuration change, and a change record (ticket) including at least part of the manually input information is registered. Part of information in the change record may be information automatically input. The purpose of registering a change record is, for example, to reliably use a standardized method or procedure in order to efficiently and swiftly make all configuration changes and to avoid the occurrence of a problem due to a change. As described above, the change record includes the component ID 802, the change type 803, and the change content 804. Further, as described above, the change record includes the change detail 805 including the change time 811. As described above, the change detail 805 may include, in place of or in addition to at least one of items other than the change time 811, an item (information) representing at least one of a purpose of the configuration change, a result of the configuration change, a degree of importance of the configuration change, a cost of the configuration change, an influence of the configuration change, an examination content as to whether to make a configuration change, or a relation with another configuration change (another change record).

An event record that is acquired on the basis of information acquired at a polling interval and a change record including manually input information have a difference.

Figure 18:
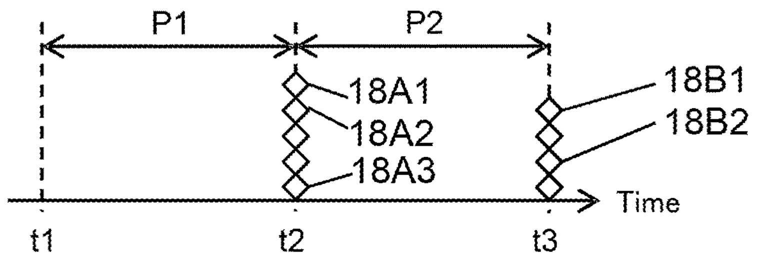
FIG. 18 illustrates an example of the acquisition of an event record.

As exemplified in FIG. 18, an event record is a record that can be mechanically (automatically) acquired, for each polling period, on the basis of a difference between information collected in the polling period and information collected in the previous polling period. For example, event records 18A1, 18A2, 18A3, . . . are records acquired on the basis of information collected in a polling period P1 and information collected in the previous polling period (not shown). Event records 18B1, 18B2, . . . are records acquired on the basis of information collected in a polling period P2 and information collected in the previous polling period P1. The polling period P1 is a period between a polling time t1 and a polling time t2 (excluding t2), and the polling period P2 is a period between the polling time t2 and a polling time t3 (excluding t3). Each polling period is the length corresponding to a polling interval.

Figure 19:
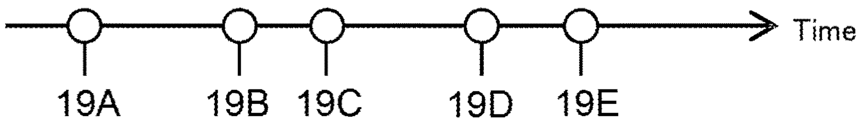
FIG. 19 illustrates an example of the acquisition of a change record.

On the other hand, as exemplified in FIG. 19, the change record is registered when the configuration has been changed, and is not dependent on the polling interval. For example, when the configuration has been changed by a user (for example, person who makes a change), each of the change records 19A to 19E is registered by the user (or another user (for example, administrator)).

As described above, an event record is a record that is automatically acquired on the basis of information collected at a polling interval, and from this viewpoint, the event record is considered to have completeness. On the other hand, a change record includes detailed information including information that cannot be specified from the collected information, but if the configuration has been changed, a change record is not registered in some cases due to omission of input. From this viewpoint, the change record is considered to lack completeness.

Figure 20:
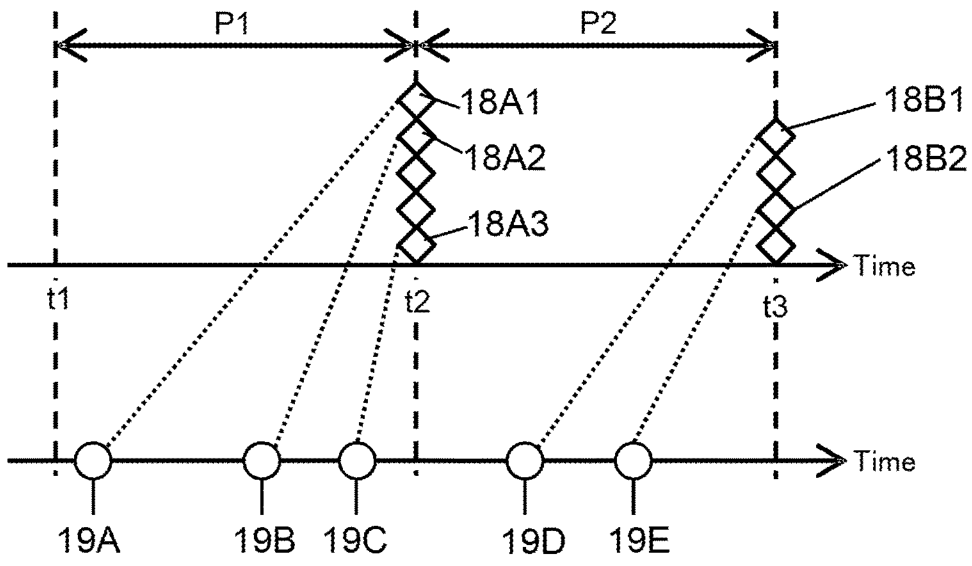
FIG. 20 illustrates an example of the association of a change record with an event record.

In view of the above, in this embodiment, the management server program 541 specifies an event record and a change record that have relevancy on the basis of one or more items in an event record, which is relatively coarse but has completeness, and one or more items in a change record, which lacks completeness but is relatively in detail, and associates at least one change record with at least one event record. According to the exemplification in FIG. 20, event records 18A1, 18A2, and 18A3 are associated with change records 19A, 19B, and 19C, respectively, and event records 18B1 and 18B2 are associated with change records 19D and 19E, respectively. Consequently, a user (for example, administrator) can know details of a configuration change represented by an event record automatically acquired on the basis of information collected at a polling interval.

For example, the following two advantages are conceivable as advantages of the association of a change record with an event record.

(Advantage 1) A configuration change that cannot be covered by a change record alone can be covered.

(Advantage 2) When the computer system 100 is large in scale or complicated, the number of change records to be registered is considered to be large. A change record can be narrowed by using an event record, and hence it is easy to specify a necessary change record.

Note that one change record is not always uniquely associated with one event record.

Figure 21:
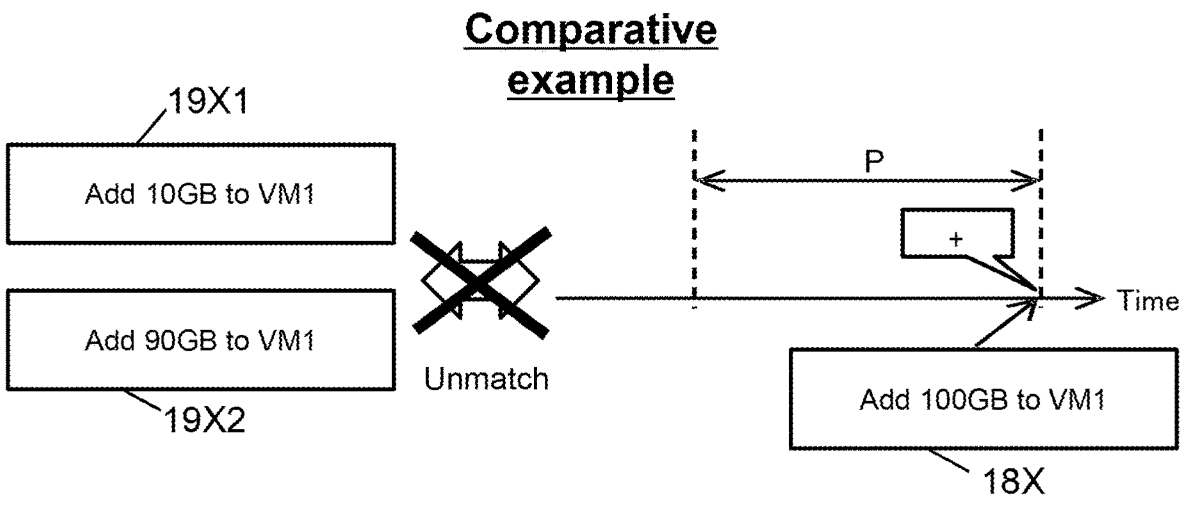
FIG. 21 illustrates a first example of unmatch of records according to one comparative example.

For example, according to one comparative example exemplified in FIG. 21, in the same polling period, a change record 19X1 representing "addition of 10 GB to VM1" and a change record 19X2 representing "addition of 90 GB to VM1" correspond to an event record 18X representing "addition of 100 GB to VM1", but each of the change records 19X1 and 19X2 does not correspond to the event record 18X on a one-on-one basis. In other words, the fact that the capacity was added twice cannot be known from the event record 18X.

Figure 22:
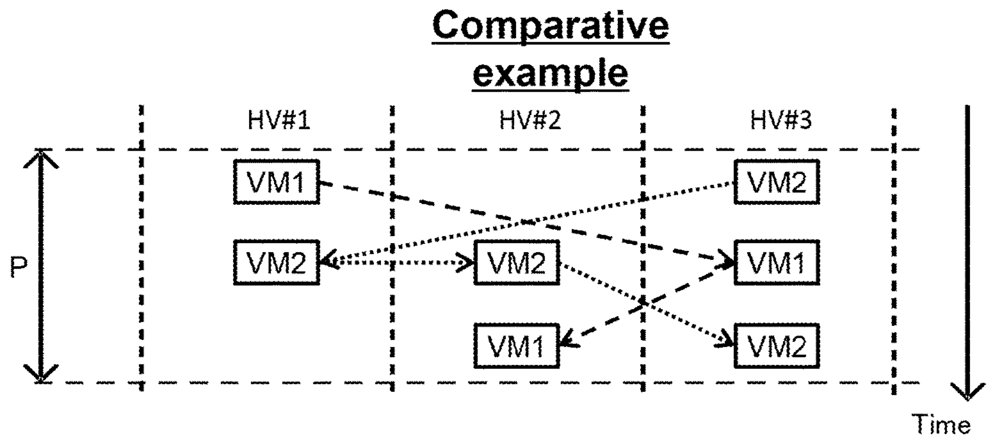
FIG. 22 illustrates a second example of unmatch of records according to one comparative example.

Further, for example, according to one comparative example exemplified in FIG. 22, in the same polling period P, even if a VM was migrated a plurality of times among HV #1 to HV #3 (example of a plurality of hypervisors), the accurate migration of the VM cannot be known from an event record. Specifically, when VM1 has migrated from HV #1 to HV #3 and migrated from HV #3 to HV #2, it is determined from an event record that VM1 has migrated from HV #1 to HV #2. Further, when VM2 has migrated from HV #3 to HV #1, migrated from HV #1 to HV #2, and migrated from HV #2 to HV #3, an event record representing that VM2 has migrated is not acquired. This is because VM2 is determined not to have migrated from HV #3.

Figure 23:
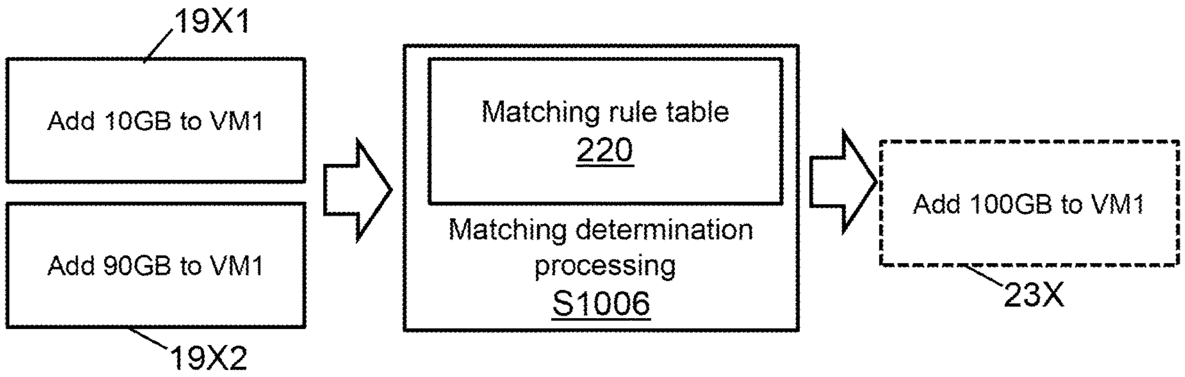
FIG. 23 illustrates an example of virtualization of a change record.
Figure 24:
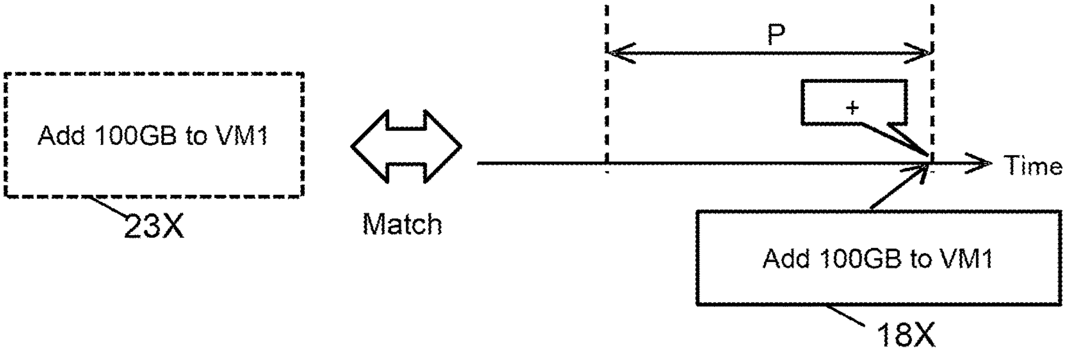
FIG. 24 illustrates an example of effects of the virtualization of the change record.

In view of the above, in this embodiment, in order to match an event record 18 and a change record 19 even in the cases exemplified in FIG. 21 and FIG. 22, the management server program 541 executes matching determination processing (S1006 in FIG. 10) using the matching rule table 220 as illustrated in FIG. 23. Consequently, a virtual change record 23 obtained by virtualizing at least part of one or more change records 19 is created, and the management server program 541 can use the virtual change record 23 to specify one or more event records 18 associated with one or more change records that are the basis of the virtual change record 23. Specifically, for example, as exemplified in FIG. 23, the management server program 541 joins the above-mentioned change records 19X1 and 19X2 to create a virtual change record 23X representing "addition of 100 GB to VM1". "100 GB" in the virtual change record 23X is the total of "10 GB" in the change record 19X1 and "90 GB" in the change record 19X2. As a result, as exemplified in FIG. 24, the virtual change record 23X obtained by virtualizing the change records 19X1 and 19X2 matches with the event record 18X.

Note that the virtualization method for the change record 19 (virtual change record creation method) is not limited to "join", and other types of virtualization methods such as "division" and "division and join" are conceivable. For example, in the case exemplified in FIG. 22, "join" can be employed as the virtualization method as long as each operation for VM migration is created as a change record 19 for each of VM1 and VM2. However, when an operation of migrating VM1 from HV #1 to HV #3 and an operation of migrating VM2 from HV #3 to HV #1 are written in a single change record, the virtualization method "join" alone cannot create a virtual change record 23 representing the migration of VM1 from HV #1 to HV #2. Thus, a virtualization method "division and join" for dividing a single change record and joining the resultant change records is employed, and matching determination using a virtual change record 23 created in accordance with the virtualization method is performed. Consequently, appropriate matching can be performed.

The change record 19 includes, in addition to a component ID 802, a change type 803, and a change content 804, a change detail 805 including a change time 811. Such a change record 19 is associated with an event record 18. The management server program 541 specifies a change record associated with an event record, and can display information represented by the event record and information represented by the specified change record associated with the event record (information including at least part of detailed information not included in the event record). For example, a user (for example, administrator) who views the displayed information can know at least one of the following.

- Change time of each of one or more actual configuration changes corresponding to the event record 18.
- Person who made a change and the reason of the configuration change for each of one or more actual configuration changes corresponding to the event record 18.
- Whether one configuration change represented by the event record 18 is actually a result of a plurality of configuration changes. (This point can be expected for rolling back the changed configuration.)
- Information indicating that a person who made a change is different though the change content in the event record is the same every time.

While one embodiment has been described above, it should be understood that this invention is not limited to the embodiment and can be variously modified within the range not departing from the gist thereof. For example, the following environment is conceivable as an example of environments to which the above-mentioned embodiment is effective.

Specifically, a plurality of users exist for the computer system 100 (for example, cloud system), and an infrastructure is the computer system 100 involving the plurality of users. The users include users (users of infrastructure), persons who make a change (operator or dedicated engineer of infrastructure), and administrators (administrators of infrastructure). The timing of a change of the infrastructure is freely determined. Specifically, a user is added (for example, node to be managed is added) or a node configuration is changed in response to a request from a user, but its timing is freely selected. Thus, in general, the infrastructure is changed by a person who makes a change rather than an administrator, or a system for automatically changing the infrastructure is used. The administrator does not always monitor a change in real time.

In such an environment, when a failure has occurred in an infrastructure, if the timing at which the infrastructure was changed can be grasped in detail, the range to be investigated for failure cause investigation (for example, time, target, and relevant node) can be easily narrowed.

Further, the reason for a change can be used for studies on a failure handling method. For example, the degree of priority for handling can be determined from the degree of importance of customers. Further, the granularity of handling can be finely adjusted. Specifically, for example, when 100 GB is available in terms of configuration management, a change can be made on 90 GB and 10 GB in a separate manner such that only 10 GB can be restored.

REFERENCE SIGNS LIST

557 Management server

The invention claimed is:

1. A management system that improves accuracy and efficiency in managing configuration changes of a computer system to identify a failure cause, comprising:

an interface coupled to a computer system that has a plurality of elements including a plurality of components and a plurality of nodes having the plurality of components;

a storage drive including one or more memories; and a processor coupled to the interface and the storage drive, wherein the processor is configured to regularly collect information from the computer system via the interface, the storage drive is configured to store a plurality of configuration information entries and a plurality of change information entries, each of the plurality of configuration information entries includes at least part of information included in the information collected from the computer system and information specified on basis of first and second information collected from the computer system through first and second collections, and is information representing a configuration change of the computer system, each of the plurality of change information entries includes information manually input for the configuration change of the computer system, and is information representing the configuration change of the computer system, and the processor is configured to associate at least one of the plurality of change information entries with at least one of the plurality of configuration information entries to manage the plurality of configuration information entries and the plurality of change information entries, wherein each of the plurality of configuration information entries represents start times of the first and second collection for the configuration information entry, each of the plurality of change information entries represents a configuration change time that is a time of the configuration change represented by the change information entry, and the processor is configured to associate a configuration information entry and a change information entry that satisfy a following condition (c01):

(c01) the configuration change time is a time which lies within an interval between the collection start times of the first and second collections, wherein each of the plurality of configuration information entries further represents a detected element ID that is an ID of an element detected as a configuration change target and a detected change content that is a content of the detected configuration change, each of the plurality of change information entries further represents an input element ID that is an element ID input as a configuration change target and an input change content that is a content of the input configuration change, and the processor is configured to associate a configuration information entry and a change information entry that satisfy the following conditions (c11) and (c12) in addition to the condition (c01):

(c11) the input element ID matches with the detected element ID; and (c12) the input change content complies with the detected change content, wherein when a configuration information entry and a change information entry that satisfy the conditions (c11) and (c12) are not found, the processor is configured to generate one or more virtual change information entries, based on at least one change information entry, each of the one or more virtual change information entries represents a virtual element ID that is an element ID conforming to an input element ID of each of one or more change information entries that are the basis of the virtual change information entries, and a virtual change content that is a configuration change content conforming to an input change content of each of one or more change information entries that are the basis of the virtual change information entries, and when a configuration information entry and a virtual change information entry that satisfy the following conditions (c21) and (c22) are found, the processor is configured to associate the configuration information entry and a change information entry that is the basis of the virtual change information entry:

(c21) the virtual element ID matches with the detected element ID; and (c22) the virtual change content complies with the detected change content.

2. The management system according to claim 1, wherein the storage drive is configured to store one or more rule entries, each of the one or more rule entries is information representing a rule defined by a virtual type that is a type of a virtual change information entry, a rule element type that is an element type to which a virtual change information entry of the virtual type is applied, and a rule change type that is a configuration change type to which a virtual change information entry of the virtual type is applied, and the processor is configured to generate, on the basis of a change information entry and a rule entry that satisfy the following conditions (c31) and (c32), a virtual change information entry of a virtual type represented by the rule entry:

(c31) an element type corresponding to the input element ID matches with the rule element type; and (c32) a configuration change type represented by the input change content matches with the rule change type.

3. The management system according to claim 2, wherein the virtual type includes a first type that means a single virtual change information entry obtained by joining one or more input change contents in one or more change information entries.

4. The management system according to claim 2, wherein the virtual type includes a second type that means a plurality of virtual change information entries obtained by dividing, for each input element ID, a single change information entry including one or more input element IDs.

5. The management system according to claim 2, wherein the virtual type includes a third type that means a single virtual change information entry obtained by joining a plurality of input change contents in a plurality of virtual change information entries obtained by dividing, for each input element ID, a single change information entry including one or more input element IDs.

6. The management system according to claim 1, wherein in each of the plurality of change information entries, the manually input information is information related to a configuration change represented by the change information entry, and includes change detail information that is information that is unspecifiable from information collected at a collection start time that is the same as or older than a time of the configuration change represented by the change information entry and at the next earlier collection start time.

7. The management system according to claim 6, wherein the change detail information includes information representing at least one of a time of a configuration change, a purpose of the configuration change, a title of the configuration change, a person implementing the configuration change, a result of the configuration change, a degree of importance of the configuration change, a cost of the configuration change, an influence of the configuration change, an examination content as to whether to make a configuration change, and a relation with another configuration change.

8. A management method for a computer system for improving accuracy and efficiency in managing configuration changes to identify a failure cause, the computer system having a plurality of elements including a plurality of components and a plurality of nodes having the plurality of components, the management method comprising:

(A) regularly collecting information from the computer system;

(B) associating at least one of the following plurality of change information entries with at least one of the following plurality of configuration information entries to manage a plurality of configuration information entries and a plurality of change information entries, including:

each of the plurality of configuration information entries including at least part of information included in the information collected from the computer system and information specified on the basis of first and second information collected from the computer system through first and second collection, and being information representing a configuration change of the computer system, each of the plurality of change information entries including information manually input for the configuration change of the computer system, and being information representing the configuration change of the computer system, (C) associating a configuration information entry and a change information entry that satisfy a following condition (c01):

(c01) the configuration change time is a time which lies within an interval between the collection start times of the first and second collections, wherein each of the plurality of configuration information entries further represents a detected element ID that is an ID of an element detected as a configuration change target and a detected change content that is a content of the detected configuration change, each of the plurality of change information entries further represents an input element ID that is an element ID input as a configuration change target and an input change content that is a content of the input configuration change, and (D) associating a configuration information entry and a change information entry that satisfy the following conditions (c11) and (c12) in addition to the condition (c01):

(c11) the input element ID matches with the detected element ID; and (c12) the input change content complies with the detected change content, (E) generating, when a configuration information entry and a change information entry that satisfy the conditions (c11) and (c12) are not found, one or more virtual change information entries, based on at least one change information entry, each of the one or more virtual change information entries represents a virtual element ID that is an element ID conforming to an input element ID of each of one or more change information entries that are the basis of the virtual change information entries, and a virtual change content that is a configuration change content conforming to an input change content of each of one or more change information entries that are the basis of the virtual change information entries, and (F) associating, when a configuration information entry and a virtual change information entry that satisfy the following conditions (c21) and (c22) are found, the configuration information entry and a change information entry that is the basis of the virtual change information entry:

(c21) the virtual element ID matches with the detected element ID; and (c22) the virtual change content complies with the detected change content.

9. A non-transitory computer-readable recording medium having recorded thereon a computer program for causing a computer for managing a computer system for improving accuracy and efficiency in managing configuration changes to identify a failure cause, the computer system having a plurality of elements including a plurality of components and a plurality of nodes having the plurality of components to execute:

(A) regularly collecting information from the computer system;

(B) associating at least one of the following plurality of change information entries with at least one of the following plurality of configuration information entries to manage the following plurality of configuration information entries and the following plurality of change information entries:

each of the plurality of configuration information entries including at least part of information included in the information collected from the computer system and information specified on the basis of first and second information collected from the computer system through first and second collection, and being information representing a configuration change of the computer system, each of the plurality of change information entries including information manually input for the configuration change of the computer system, and being information representing the configuration change of the computer system, (C) associating a configuration information entry and a change information entry that satisfy a following condition (c01):

(c01) the configuration change time is a time which lies within an interval between the collection start times of the first and second collections, wherein each of the plurality of configuration information entries further represents a detected element ID that is an ID of an element detected as a configuration change target and a detected change content that is a content of the detected configuration change, wherein each of the plurality of change information entries further represents an input element ID that is an element ID input as a configuration change target and an input change content that is a content of the input configuration change, (D) associating a configuration information entry and a change information entry that satisfy the following conditions (c11) and (c12) in addition to the condition (c01):

(c11) the input element ID matches with the detected element ID; and (c12) the input change content complies with the detected change content, (E) generating, when a configuration information entry and a change information entry that satisfy the conditions (c11) and (c12) are not found, one or more virtual change information entries, based on at least one change information entry, wherein each of the one or more virtual change information entries represents a virtual element ID that is an element ID conforming to an input element ID of each of one or more change information entries that are the basis of the virtual change information entries, and a virtual change content that is a configuration change content conforming to an input change content of each of one or more change information entries that are the basis of the virtual change information entries, and (F) associating, when a configuration information entry and a virtual change information entry that satisfy the following conditions (c21) and (c22) are found, the configuration information entry and a change information entry that is the basis of the virtual change information entry:

(c21) the virtual element ID matches with the detected element ID; and (c22) the virtual change content complies with the detected change content.

* * * * *